Sept. 10, 1963
M. MAYRATH
3,103,274
ARTICULATED CONVEYOR WITH TRANSFER MEANS
Filed June 21, 1961
2 Sheets-Sheet 1
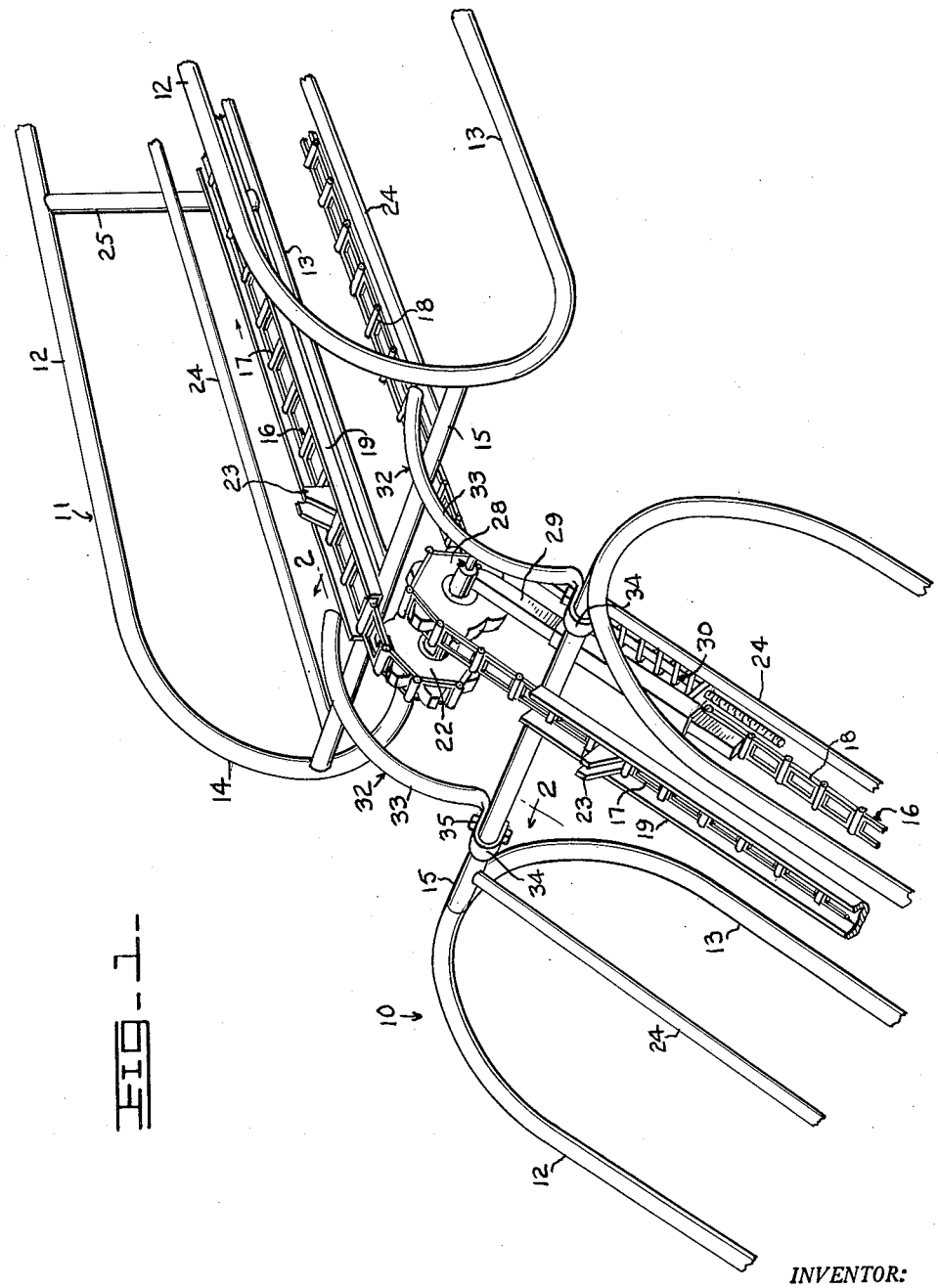
INVENTOR:
MARTIN MAYRATH
BY
Homer R. Montague
Atty.

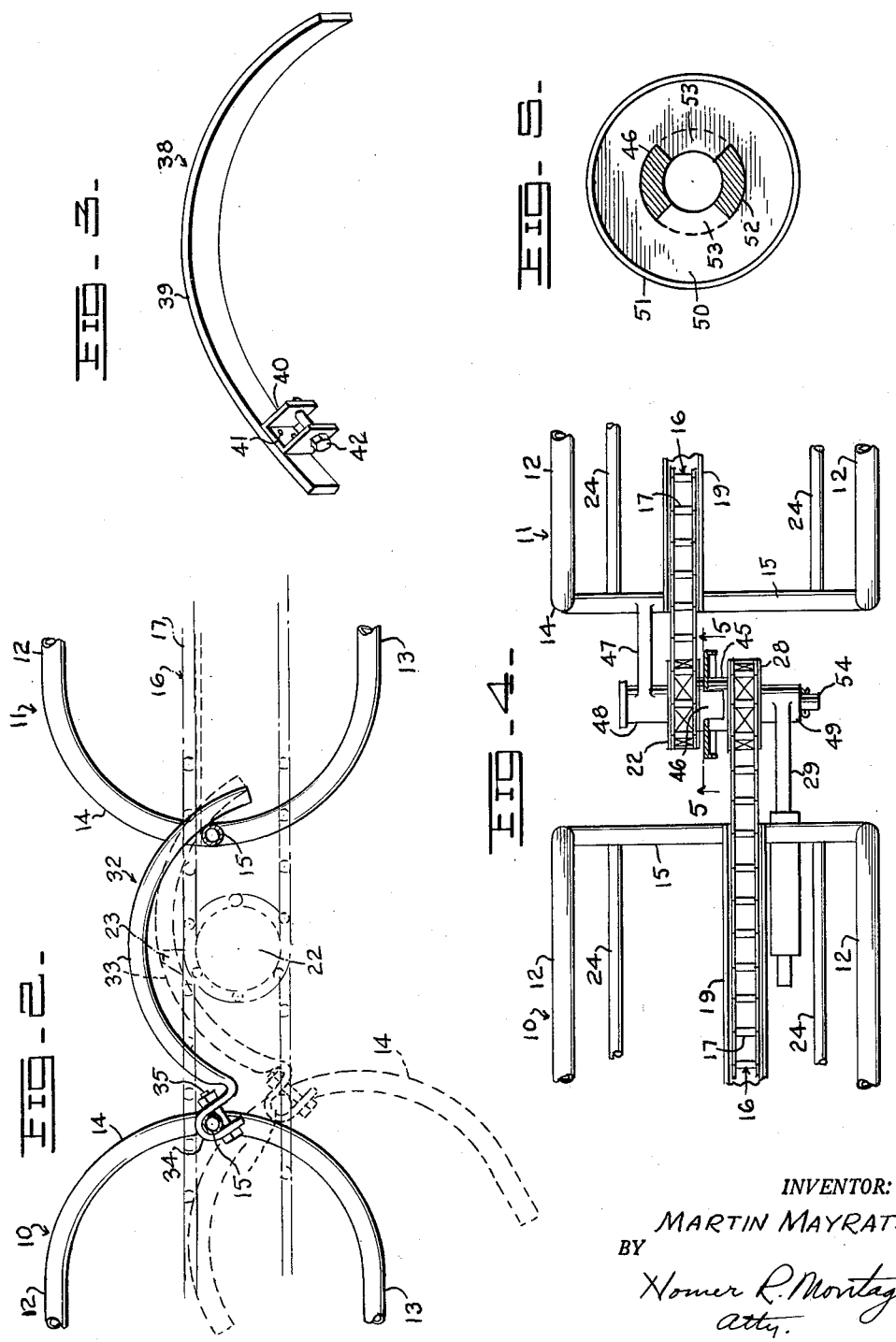

United States Patent Office 3,103,274
Patented Sept. 10, 1963

3,103,274
ARTICULATED CONVEYOR WITH
TRANSFER MEANS
Martin Mayrath, 10707 Lennox Lane, Dallas, Tex.
Filed June 21, 1961, Ser. No. 118,647
8 Claims. (Cl. 198—108)

This invention relates to conveyors, and more particularly to a conveyor of the type employed for conveying bales of hay for storing them in barns or the like.

There are available commercially conveyors, including those having articulated sections, employing one or more endless members having upstanding attachments or pushers for moving a bale of hay along the conveyor. Where the end of a conveyor section is reached, whether it be the final one of a plurality of articulated conveyors or the outlet end of a preceding conveyor, the flexible member carrying the bale pushers passes around a sprocket to return in a lower run to the inlet end of the conveyor section. The swinging of each pusher around a sprocket tends to cause the pusher to dig into the bale, thus causing some of the hay to be pulled out of the bale, which loose hay frequently wraps around the sprocket and will finally break the chain or other endless member or stall the machine. Moreover, it is now becoming common to bale hay in shorter bales, more like a cube in shape. Such bales have a tendency to turn sideways in the bale mover, and lying at an angle in the conveyor as they do, the pusher is apt to break a bale tie as it leaves the bale when swinging around a sprocket at the outlet end of a conveyor section.

An important object of the present invention is to provide novel means, operative at a point where a bale pusher passes over its outlet sprocket, to elevate the bale out of contact with the pusher to prevent the latter from tearing hay loose from the bale and to prevent possible breaking of a bale tie by a pusher.

A further object is to provide a conveyor of this character wherein the means for elevating the bale over the outlet sprocket is arched over the sprocket so that the bale can be very readily slid thereover from a final conveyor section or from a preceding to a following section of an articulated conveyor.

A further object is to provide a means of the character referred to which is adapted to function between two articulated conveyor sections regardless of the angular adjustment between such conveyor sections.

A further object is to provide bale elevating means particularly adapted for use between sections of an articulated conveyor and which means is carried by one conveyor section and has contacting engagement with the adjacent section, which contacting engagement is not disturbed by angular adjustment between the conveyor sections so that a bale passing from one section to another always will be lifted out of engagement with the bale pusher by which it is being propelled.

A further object is to provide a novel device which may be circular in form and arranged concentric with and secured to a conveyor chain sprocket or sprockets, which device is larger in diameter than the sprockets so as to elevate a bale as it passes over a sprocket to prevent the tearing loose of hay from the bale or the damaging of a bale tie.

Other objects and advantages of the invention will become apparent during the course of the following description.

In the drawings I have shown several embodiments of the invention. In this showing:

FIGURE 1 is a fragmentary perspective view of the adjacent ends of articulated conveyor sections showing the invention applied;

FIGURE 2 is a section taken substantially on line 2—2 of FIGURE 1, showing adjacent ends of the conveyor sections in horizontal alinement in solid lines with one of the conveyor sections in dotted lines, in an angularly adjusted position, and indicating the conveyor chains and a sprocket in broken lines;

FIGURE 3 is a detail perspective view of a modified form of a curved connector rail for elevating the hay bale over a sprocket;

FIGURE 4 is a plan view of the adjacent ends of conveyor sections showing a further modified form of the device; and FIGURE 5 is an enlarged detail section on line 5—5 of FIGURE 4.

Referring to FIGURES 1 and 2, the numerals 10 and 11 indicate a pair of articulated conveyor sections of a type employed for conveying hay bales. These conveyor sections may be of the type shown in the prior patent to L. C. Wilcoxen, No. 2,951,577, granted September 6, 1960. Each section comprises main frames having upper and lower outer rails 12 and 13 connected at their ends by preferably integral curved portions 14 between which extend cross members 15 welded thereto. Each conveyor section is provided with a conveyor chain 16 having upper and lower runs 17 and 18, the former of which travels through a longitudinal guide or pin 19 supported at the ends of each conveyor section by the cross members 15.

At the inlet end of the conveyor section 11 is arranged a sprocket 22 supported in any suitable manner by the cross member 15 at the inlet end of the conveyor 12. The supporting means for this sprocket may be as shown in the prior patent referred to and as generally illustrated in FIGURE 4, described below. The chain 16 of the conveyor section 12 obviously passes around the sprocket 22 and at spaced intervals the links of the chain are provided with pushers 23 to move bales along the conveyor between the side rails, the bales being slidable over and along supporting rails 24 welded at their ends to the cross members 15. The upper and lower rails 12 and 13 are connected at spaced points by posts 25 and any suitable number of cross members (not shown) between such posts may extend transversely of the conveyor section to support the rails 24.

The conveyor section 10 may be identical with the conveyor section 11 and similar parts are indicated by the same reference numerals. The chain 16 of the conveyor section 10 passes around a sprocket 28 coaxial and having driving connection with the sprocket 22, also as shown and described in the prior patent referred to and as generally illustrated in FIGURE 4 and described below. The sprocket 28 is supported by an arm 29 having suitable means generally indicated by the numeral 30 for tensioning the chain 16. This tensioning means also is shown in the prior patent referred to and is preferably employed at the outlet end of the conveyor section 11. The chain tensioning means forms no part of the present invention.

Two bale elevating devices, each indicated as a whole by the numeral 32, are adapted to elevate a bale passing over the sprockets 22 and 28 to prevent the pushers 23 of the conveyor section 10 from damaging the bale. In the form of the invention shown in FIGURES 1 and 2, each bale raiser or elevator has a preferably tubular body 33 arched from end to end as clearly shown. One end of each tubular member is flattened and bent upwardly and looped around the cross member 15 of one of the conveyor sections as at 34. Such looped end is fixed in position with respect to the cross member 15 which it engages by a bolt 35, and the bolt and its looped end maintain each tubular member 33 in pivotal engagement with the cross member 15 to which it is connected. The other or free end of each member 33 merely extends over in contact with and downwardly past the cross member 15 of the next conveyor section, as clearly shown in FIGURE 2.

It will be apparent from FIGURE 1 that the two devices 32 are arranged on opposite sides of the longitudinal centers of the conveyor sections, inwardly of the supporting rails 24. The arching of the members 33 is sufficiently high so that bales sliding over these members, above the sprockets 22 and 28, will be moved clear of the pushers 23 engaging the bale as the latter swings over the sprocket 28, in any adjusted relative angular positions of the conveyor sections, as will be clear in FIGURE 2.

If desired, a slightly different type of bale raiser 38 may be employed as shown in FIGURE 3. This device comprises a relatively flat body 39 arched from end to end, and the device may be formed of bent relatively heavy plywood, metal or any other material. A U-shaped bracket 40 is riveted as at 41 to the body 39 to receive one of the cross members 15 and is maintained in engagement therewith to pivot thereabout by means of a bolt 42. As in the previous case, one end of the device 38 will be pivoted about one of the cross members 15 while the other end will be free to slide over the cross member 15 of the next adjacent conveyor section.

A modified type of bale raiser is shown in FIGURE 4 and this type may be used either between two articulated conveyor sections or at the end of the final conveyor section. In FIGURE 4 it will be noted that the sprockets 22 and 28 are provided with a positive drive connection 45, as shown in the prior patent referred to, comprising interlocking dogs 46 (FIGURES 4 and 5). The sprocket 22 is supported with respect to the conveyor section 11 by an arm 47, and common pivoting means for the two sprockets extends through a collar 48 carried by the arm 47 and through a collar 49 carried by the arm 29.

The bale raising device shown in FIGURES 4 and 5 comprises a stamped relatively heavy sheet metal disk 50 having an annular flange 51 at its periphery to prevent the cutting of the bale. The disk 50 is provided with slots 52 to receive two of the dogs 46 and is provided with inwardly extending lug portions 53 fitting between such dogs, the bale raising device fixed in position by the means, such as a tie tube 54 (FIGURE 4), extending through the collars 48 and 49. It will be noted that the diameter of the flange 51 is greater than the diameter of the sprockets to elevate a hay bale passing thereover. Where the bale raising device just described is used at the outlet end of the final conveyor section, any suitable means may be employed for fixing it in position relative to the sprocket 28 of such conveyor section. The specific means for fastening the bale raising element in position is unimportant.

*Operation*

Where articulated conveyor sections are used as in FIGURES 1 and 2, successive bales are placed in position on the lower or inlet end of the conveyor section 10, supported by the rails 24 thereof. Each successive bale will be engaged by a pusher 23 to be propelled toward the outlet end of the conveyor section 10 to be transferred to the conveyor section 11. As a bale reaches the outlet end of the conveyor section 10, the advancing edge of the bale will engage the arched tubular members 33 (FIGURES 1 and 2) to be elevated thereby, and as the center of gravity of the bale passes over the members 33, the bale will be held elevated above the path of travel of the previously operative pusher 23 as the latter passes around the sprocket 28. As this pusher swings at an angle around the sprocket 28, without the use of the present device, the top ends of the pusher tend to dig into the bale to loosen the straw and such loose straw tends to collect around the sprockets 22 and 28 and will result finally in the breaking of the chains or the stalling of the machine. This is prevented with the present device since the previously operative pusher will be disengaged from the bale as it passes over the members 33. Moreover, where shorter bales are being conveyed, there is a tendency for such bales to swing at an angle on the conveyor, which has resulted in the breaking of bale ties by the members 23. The disengagement of the bales from the pusher 23 prevents such breakage of the bale ties.

If the two conveyor sections are angularly adjusted relative to each other, the loops 34 are free to pivot on the adjacent cross member 15 while the free ends of the members 35 remain in contact with the cross member 15 at the inlet end of the next conveyor, the members 33 merely sliding over such cross member. In any adjusted positions of the parts, the bale will be elevated as it passes over the sprockets to be released from the pushers 23 associated with the conveyor section 10.

The operation of the form of the device shown in FIGURE 3 is identical with that previously described. Since the member 39 is not tubular, it cannot be flattened to form the pivotal connection necessary with one of the cross members 15. Where a flat member 39 is used, its thickness, in order to provide the desired strength, prevents its being bent around one of the cross members 15. Hence the bracket 40 and bolt 42 are employed for providing the necessary pivotal connection.

In the form of the invention shown in FIGURES 4 and 5 the disk 50 is placed in position as shown and has its flange 51 concentric with and of greater diameter than the sprockets 22 and 28. As a bale is pushed from the conveyor section 10, therefore, it will engage the flange 51 and will be elevated thereby so that as it passes over the sprockets it will be elevated out of engagement with the previously operative pusher 23 and then will pass onto the conveyor section 11.

From the foregoing it will be apparent that the present invention provides means curving over and above the level of the top of an endless conveying member having pushers for conveying the articles, thus lifting the articles particularly at the point where the pushers pass around their pulleys or sprockets. When the latter operation takes place, the pushers have their upper ends moving in advance of the lower ends, thus assuming angular positions in which the article, such as a hay bale, will be protected from damage. In each case, the article raiser not only is arched but is supported in such arched position to effect the transfer of the article from one conveyor to another or for discharging it from the end of a conveyor smoothly and efficiently and without damage to the articles or any parts of the conveyor or conveyors.

It is to be understood that the forms of the invention shown and described are to be taken as preferred examples of the same and that various changes in the shape, size, and arrangement of the parts may be made which will not depart from the spirit of the invention or the scope of the appended claims.

What is claimed is:

1. In a conveying mechanism, a pair of conveyor sections in end-to-end relation and provided with frames including cross members extending transversely of said frames at the adjacent ends of said conveyor sections, an endless member traveling longitudinally of each conveyor section and each provided with a pusher, coaxial connected sprockets lying between said conveyor sections and around which said endless members respectively pass, and raising means pivotally connected to one cross member and lying over in contact with and supported by the other cross member, said raising means between said cross members being arched upwardly from a level beneath the plane of travel of said endless member to a level higher than the tip of said pusher, to raise an article, as it passes over said rotary members, wholly above said pushers as the article passes from one conveyor section to the other.

2. A conveying mechanism according to claim 1 wherein said raising means comprises a pair of elongated members arranged on opposite sides of said sprockets, each such member being pivotally connected at one end to one cross member and having its other end portion bearing on the other cross member.

3. In a conveying mechanism, a pair of articulated conveyor sections having adjacent spaced ends, a pair of coaxial sprockets in driving engagement with each other and carried respectively by said conveyor sections and having means for mounting them on a common turning axis for the adjustment of the angular positions of said conveyor sections, a conveyor chain for one conveyor section passing around one of said sprockets, a conveyor chain for the other conveyor section passing around the other of said sprockets, pusher elements carried by the first-named chain and projecting thereabove for propelling articles from said one conveyor section for transfer to the other conveyor section, and raising means supported between said conveyor sections and having upwardly curved portions extending from below the level of said pusher elements to a level wholly above the path of travel of said pusher elements and over which an article is adapted to slide from said one conveyor section to the other wholly above and out of contact with said pusher elements.

4. A conveying mechanism according to claim 3 wherein said raising means is pivotally connected to one of said conveyor sections and bears on a portion of the other conveyor section to be supported thereby, whereby said conveyor sections are adapted to assume different angular positions relative to each other.

5. In a conveying mechanism having a pair of conveyor sections arranged with adjacent ends spaced from each other, each conveyor section comprising a supporting frame including side frame members and a cross member connected therebetween, a pair of coaxial sprockets arranged in the space between said conveyor sections and supported respectively by said cross members, a conveyor chain forming part of one of said sections having an upwardly projecting pusher to propel articles therealong and passing around one of said sprockets, a chain for the other conveyor section passing around the other sprocket, a pair of article raisers spanning the space between said conveyor sections and each pivotally connected at one end to one of said cross members, the other end of each article raiser bearing upon the other cross member and said raisers being arched intermediate their ends above the level of the top of said pusher as it passes around its sprocket whereby articles will move between said conveyor sections wholly out of contact with said pusher.

6. In a conveyor having a frame provided with an outlet end, a sprocket arranged at said outlet end, a chain passing around said sprocket and having upper and lower runs, a pusher carried by said chain and projecting upwardly therefrom in its upper run for propelling an article along said conveyor for discharge at said outlet end, and means supported with respect to said sprocket and having an arched portion over which an article is adapted to slide, such arched portion extending from a level beneath said pusher and thence to a level wholly above the level of the upper limit of said pusher as the latter reaches the top of said sprocket, to completely release said pusher from the article.

7. In a conveyor having a frame provided with an outlet end, a sprocket arranged at said outlet end, a chain passing around said sprocket and having upper and lower runs, a pusher carried by said chain and projecting upwardly therefrom in its upper run for propelling an article along said conveyor for discharge at said outlet end, and an annular article raiser fixed with respect to said sprocket for rotation therewith and of such diameter as to support an article in its movement thereover wholly above the upper limit of said pusher when the latter reaches the top of said sprocket whereby the article at that point will be wholly disengaged from said pusher.

8. In a conveying mechanism comprising a pair of articulated conveyor sections having adjacent ends spaced from each other, a pair of coaxial sprockets carried respectively by said conveyor sections in driving relation with each other, a chain for one conveyor section passing around one of said sprockets and having upper and lower runs, a pusher carried by said chain and projecting upwardly therefrom in its upper run to propel articles along said one conveyor section for movement onto the other conveyor section, said other conveyor section comprising a conveyor chain passing around the other sprocket, and an annular article raising device concentric with and fixed to said sprockets and arranged therebetween, the diameter of said article raising device being such that when an article approaches said sprockets, it will ride over said article raising device wholly above and disconnected from said pusher as the latter passes over its sprocket.

References Cited in the file of this patent

UNITED STATES PATENTS

| | | |
|---|---|---|
| 167,519 | Fowler | Sept. 7, 1875 |
| 2,390,419 | Brown | Dec. 4, 1945 |
| 2,951,577 | Wilcoxen | Sept. 6, 1960 |